Aug. 12, 1969 W. LOVELAND ETAL 3,461,020

TAPE APPLYING MECHANISM EQUIPPED WITH TAPE TENSIONING MEANS

Filed Aug. 6, 1965 4 Sheets-Sheet 1

TAPE APPLYING MECHANISM EQUIPPED WITH TAPE TENSIONING MEANS

Aug. 12, 1969 W. LOVELAND ET AL 3,461,020

TAPE APPLYING MECHANISM EQUIPPED WITH TAPE TENSIONING MEANS

Filed Aug. 6, 1965 4 Sheets-Sheet 4

United States Patent Office 3,461,020
Patented Aug. 12, 1969

3,461,020
TAPE APPLYING MECHANISM EQUIPPED WITH TAPE TENSIONING MEANS

Winton Loveland, Freeport, and Saul Warshaw, New York, N.Y., assignors to The Loveshaw Corporation, Farmingdale, N.Y., a corporation of New York Continuation-in-part of application Ser. No. 139,676, Sept. 21, 1961. This application Aug. 6, 1965, Ser. No. 477,870
Int. Cl. B65b *51/06*
U.S. Cl. 156—468 5 Claims

ABSTRACT OF THE DISCLOSURE

Mechanism to wipe gummed tape on top, bottom and end walls of traveling cartons for anchorage of flap closures. It includes two paired tape pressing means with one temporarily to hold the leading end portion of tape against the carton top wall in the vicinity of the leading top corner while the other, comprising a tape engaging roll carried by the free end of a pivoted arm, travels down in front of the leading end wall and then retracts upward to turn back over this top corner. The improvement comprises in such mechanism a finger mounted on this arm and having a nose projecting beyond the roll to engage the portion of the tape leading end draped over the leading carton end wall and to press it progressively against the latter with frictional drag as the roll is lowered in front of and out of contact with this end wall, for tensioning the tape across this corner to remove any loose loop therein. As this roll is retracted up this leading carton end wall to turn back over this top front corner the finger nose is disengaged from the tape and the roll now presses this wiped on tape end against the carton end wall.

The invention is concerned with a machine for applying adhesive tape to articles such as cartons. It is directed in particular to an assembly of wipe down rolls for smoothing out the tape and pressing it into firm engagement with the carton. The present application is concerned with an improvement of the invention described and claimed in and is a continuation-in-part of our copending patent application Ser. No. 139,676 of Sept. 21, 1961 for Tape Applying Mechanism, now U.S. Patent No. 3,236,716 of Feb. 22, 1966.

It is an object of the present invention to provide simple but effective means associated with such an assembly of wipe down rolls which will assure application to each carton of the tape in taut condition free from undesirable wrinkles or lap backs that might otherwise occur under certain conditions.

Another object of the invention is to provide such means in a form which will employ effectively frictional slide over a portion of the tape being applied while another portion is held effectively anchored so as to stretch out the tape with removal of any intervening loose loop that may ultimately cause a wrinkle in the applied tape.

A further object is to provide a structural embodiment of this improved means which may be readily constructed and added to allow efficient use and operation thereof. Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figures 1, 2, 3:
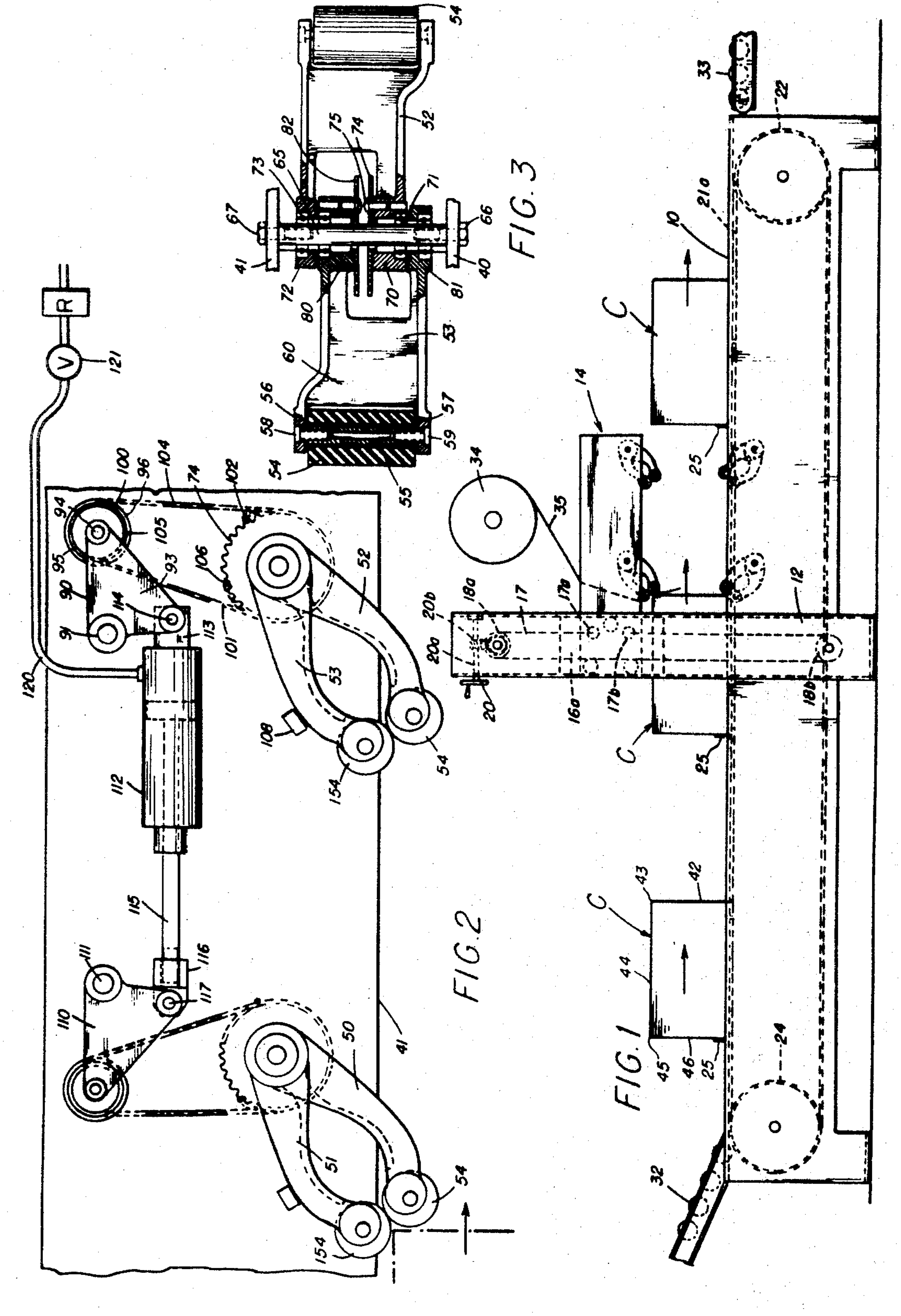
FIG. 1 is a view in elevation of a tape applying machine embodying the features disclosed in our identified application Ser. No. 139,676 with omission of various details but showing the general plan of the machine.
FIG. 2 is an enlarged view, with parts broken away, in elevation of the mechanism of this machine for applying the top tape with the front plate removed to show more clearly the wipe down rolls and the supporting and operating mechanism therefor.
FIG. 3 is a plan view of a pair of wipe down rolls shown at the right in FIG. 2 but with the arms carrying the rolls expanded into wide open position.
Figures 4, 5, 6, 7, 8:
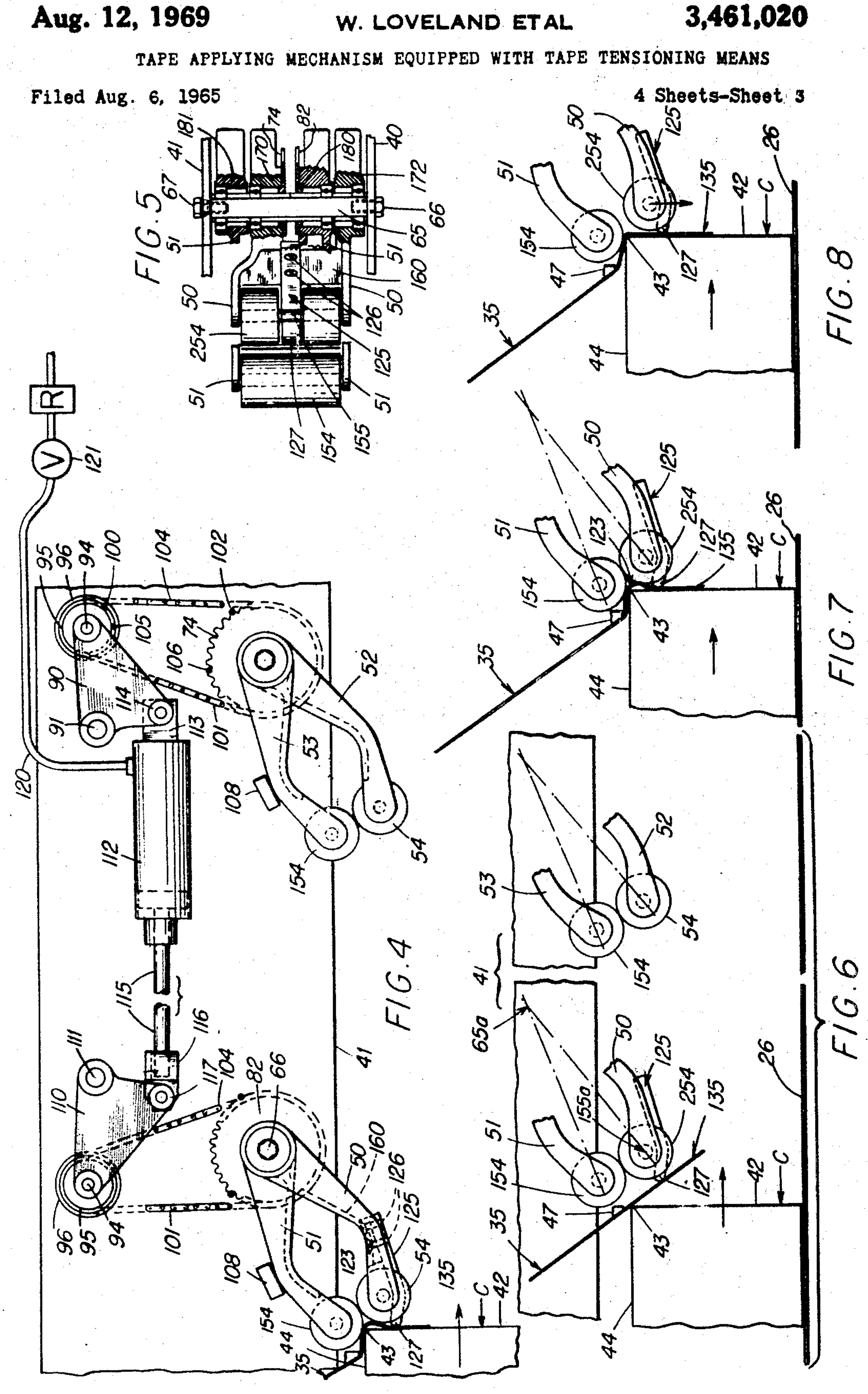
Figure 9:
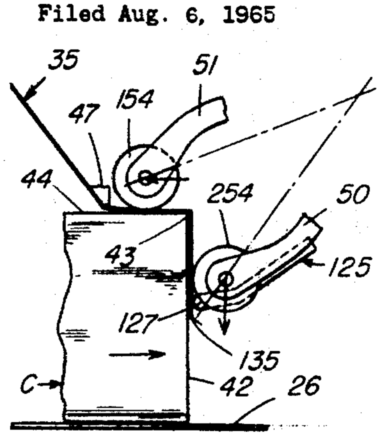
Figure 10:
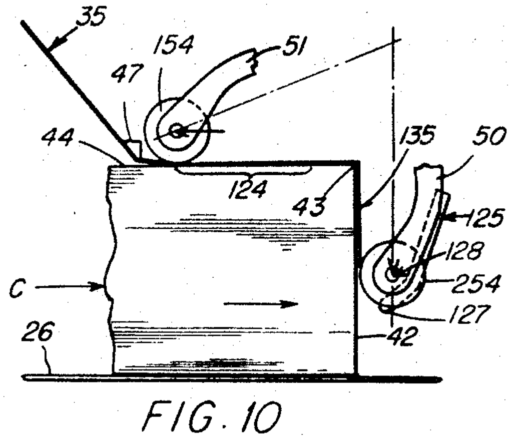
Figure 11:
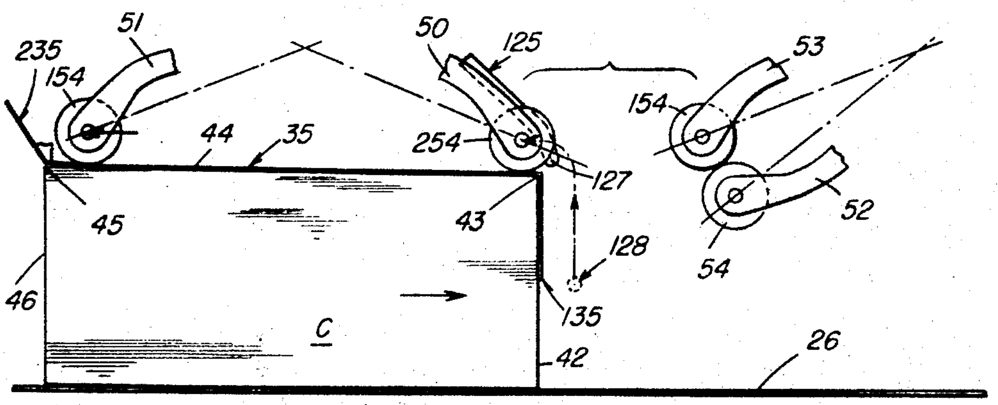
Figure 12:
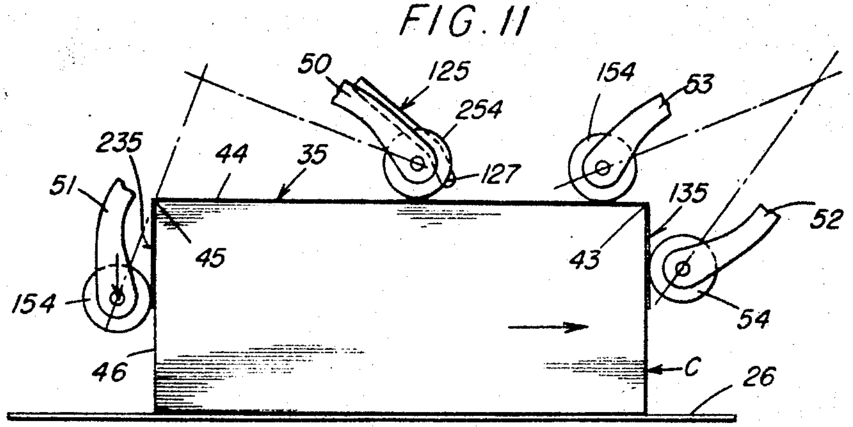

FIG. 4 is a view similar to FIG. 2, with parts broken away, of a similar structure equipped with the improved top tape laying and smoothing means of the present invention showing a portion of an approaching carton with a piece or strip of adhesive tape draped over the top leading end to be wiped smooth against the walls thereof in accordance with a plural-step tape applying procedure, one step of which is illustrated therein;

FIG. 5 is a top plan view, with parts broken away and in section, of the leading set or pair of wipe down rolls shown in the left side portion of FIG. 4;

FIG. 6 is a side elevational view, with parts broken away, of the two sets of wipe down rolls depicted in FIG. 4 and their common support, illustrating the location of a piece or strip of adhesive tape in the path of the leading top end of an advancing carton to be applied to the latter by the sets of wipe down rolls as a first step in the application procedure;

FIG. 7 is a view similar to the left side portion of FIG. 6, with parts broken away, illustrating the next or a second step of the tape application procedure and that which is shown in FIG. 4;

FIG. 8 is a view similar to FIG. 7 illustrating a third step of the tape application procedure;

FIGS. 9 and 10 are views similar to FIGS. 6 and 7 and respectively depicting fourth and fifth steps of the tape application procedure, and FIGS. 11 and 12 are views somewhat similar to FIG. 6, showing portions of both sets of wipe down rolls and also the entire carton while illustrating sixth and seventh steps of the tape application procedure.

Referring to the drawings, in which like numerals identify similar parts throughout, it will be seen that the carton sealing machine illustrated by way of example in FIG. 1 embodies a base section comprising particularly opposed and laterally-spaced side plates 10 and vertical plates or channels 12 secured thereto on which is mounted the upper tape applying means indicated generally at 14. The tape applying unit 14 will normally be made vertically adjustable on these plates or channels 12. The drawings disclose one form of a suitable means for the purpose in which the unit 14 is mounted on elevator plates **16*a* vertically slidable in the channels 12. A chain 17 has its ends secured in the plate 16*a* as is indicated at 17*a* and 17*b* and at the top is lapped around sprocket 18*a* secured on a cross shaft, and around a similar sprocket 18*b* at the bottom. The elevator plates 16*a*, and thereby the unit 14 are vertically adjusted through rotation of handwheel 20 mounted on a shaft 20*a* which carries a worm 20*b* meshing with a worm wheel secured on the cross shaft which supports the sprocket 18***a*. The machine will also embody other details which form no part of the present invention and details thereof are omitted in the interest of clarity. In general the machine as a whole may be of the type disclosed in the patent to Stagmeier No. 2,052,903 as representative of machines in which the present invention may be embodied.

The machine includes appropriate means for advancing therethrough articles such as the cartons indicated at C in the drawings. Such carton feeding means may comprise a pair of laterally-spaced and longitudinally-extending chains 21*a* lapped about spaced sprockets mounted between the side plates 10, the sprockets at the right end being indicated at 22 and similar sprockets being mounted at the left end in FIG. 1 as indicated at 24. The chains carry at suitably spaced positions a series of transverse bars or flights 25 each adapted to engage against a carton and advance it. The cartons rest on and slide along longitudinally-extending horizontal plates which may be supported by the side plates 10, such horizontal plates being indicated at 26 in FIGS. 6 to 12 inclusive. The upper surfaces of the plates 26 preferably carry laterally-spaced side flanges as guides for the carton which may be adjustable laterally through any suitable means to accommodate and guide cartons of different widths.

Suitable conveyor means may be provided at each end of the tape applying machine such as the series of feed rollers indicated at 32 in FIG. 1 for directing the cartons onto the carton advancing conveyor of the machine, and a similar type of roller conveyor indicated at 33 for receiving the taped cartons. Machines of this type commonly embody various other features such as means for folding down and holding the carton flaps preliminary to engaging the tape and tape applying mechanism, such as that illustrated in our copending patent application Ser. No. 219,212 of Aug. 24, 1962, for Automatic Carton Closing Machine, now U.S. Patent No. 3,236,022 of Feb. 22, 1966.

The present machine is designed to apply tapes to both the upper and lower surfaces of the cartons, the tape supply roll for the upper tape applying means being indicated at 34 in FIG. 1 from which is drawn the gummed tape 35. Similar tape supply means are mounted in the base for supplying tape to the bottom of the carton. The tape most commonly is of the type coated with a dried adhesive and the mechanism accordingly will include means for applying moisture to the surface of the adhesive and also devices for cutting off the tape at appropriate points. Such means and devices are well-known in the prior art and the present disclosure will not be encumbered with details thereof. The aforementioned patent to Stagmeier 2,052,903, however, shows tape applying means including typical means for applying moistening fluid to the gum on the tape, and automatically operated tape cutter means.

Referring now to the detailed construction of the tape applying means the description will be directed particularly to the mechanism for applying the tape to the upper side of the carton but it will be apparent that a similar mechanism may be positioned below the path of the carton and may be constructed and operate similarly to the top tape applying means. The upper tape applying mechanism is mounted between a pair of supporting plates 40 and 41 (see FIG. 3), the front plate 40 being removed in FIG. 2 to disclose more clearly the operating elements. In the present embodiment there are two sets or pairs of wipe down arms 50, 51 and 52, 53 respectively each carrying at its outer end a tape engaging member comprising rolls 54 and 154 shown particularly in FIG. 3. The roll, 54 or 154, is composed of suitable resilient material such as rubber and is rotatable on a sleeve 55 secured between a pair of spaced bosses, indicated at 56 and 57 for the arm 53, by means of screws 58 and 59 respectively threaded into the ends of the sleeve. The parts 56 and 57 are connected together to form a unit as by the web 60 indicated in FIG. 3. The mating arm 52 is similarly constructed.

The arms 52 and 53 are suitably supported on a common axis between the two plates 40 and 41, the mounting means in the present case comprising a central shaft 65 extending between the two plates 40 and 41 and secured therein by bolts 66 and 67 screw-threaded into the opposite ends of the shaft 65 which is held stationary thereby. As will be seen in FIG. 3 the arm 52 includes an enlarged boss 70 supported on shaft 65 through the intermediary of a sutiable bearing such as the ball bearing 71 and the other side of the arm 52 also has a thinner boss portion 72 likewise supported on the shaft 65 through the intermediary of a ball bearing 73. Secured to the boss 70 and rotatable therewith is a sprocket 74 which is so held by suitable means such as the screw 75 extending through the sprocket and engaged in a hole in the boss portion 70.

The arm 53 is similarly constructed and the two arms are symmetrically related, that is arm 53 has an enlarged boss 80 and a thinner boss 81 rotatably mounted on the shaft 65 and secured to boss 80 is a sprocket 82 similar to sprocket 74. The two arms 52 and 53 are independently rotatable on the shaft 65. The larger boss portions 70 and 80 are offset inwardly in each case to accommodate the smaller bosses 81 and 72 respectively as shown in FIG. 3, whereby the rolls 54 and 154 operate in the same path. The pair of arms 50, 51 are substantially the same in construction and relation as the pair of arms 52, 53.

The operating unit for swinging the arms on their pivotes will now be described. Mounted between the plates 40, 41 is a bracket or bell crank 90 shown in side elevation in FIG. 2. The bell crank 90 is adapted to swing on the pin 91 secured between the plates 40, 41 by screw studs extending through the plates into the ends of this pin. Both arms of bell crank 90 are defined together by a pair of transversely-spaced flanges 93 which extend laterally from pivot support 91 so that each is in the form of a fork, and mounted therein on a fixed pin 94 is a pair of sprockets 95 and 96 which may be made integral with each other or otherwise joined to rotate together. Suitable bearing means are provided for rotary support of sprockets 95 and 96 on pin 94. Power means is provided to swing the operating unit embodying the bell crank 90 on its pivot 91 as will shortly be described. The sprockets 95 and 96 have a special flexible drive connection with sprockets 74 and 82 respectively. Secured to sprocket 95 at some suitable point in its periphery such as at 100 is a chain 101 which extends around the sprocket from point 100 in a counterclockwise direction in FIG. 2 and continues down around sprocket 74 in a similar counterclockwise direction and is pinned thereto at an appropriate point such as indicated at 102. Similarly but in a reverse direction a chain 104 is pinned to sprocket 96 at a point such as indicated at 105 and extends therefrom around sprocket 96 in a clockwise direction and down and around sprocket 82 in a clockwise direction and is pinned to the latter as at 106. As a result of the arrangement swinging bell crank 90 about its pivot 91 in a counterclockwise direction serves to swing the arms 52 and 53 into a closed scissor relation such as indicated in FIG. 2. It will be appreciated that other types of operative connections may be employed between the bell crank 90 and the arms 52 and 53 such as a gear connection in each case or other kinds of flexible means such as plain cables wrapped around pulleys or drums. Whether in the form of sprockets or pulleys, for example, the elements are of course of the general class of wheels and the term "wheels" as employed herein is intended to comprehend all such rotary elements as sprockets, sheaves, pulleys or gears and whether or not they are in the form of complete circles or suitable segments. In this connection it will be apparent that in most applications, for the elements shown as full sprockets, segments of suitable angular extent would be sufficient.

It is necessary that the scissor arms 52 and 53 not also be urged together in a closed scissor position but also that they normally be caused to move to an appropriate position for effective operative engagement by the advancing carton. Various means may be employed for this purpose but the present arrangement enables that function to be accomplished without added elements. Basically this is effected by making the radius or effective lever arm of one of the sprockets of a pair different from that of the other sprocket of that pair. In the present embodiment the sprocket 95 is made smaller than the sprocket 96 which causes greater torque on arm 52 than that on the opposed arm 53. As a consequence the two arms swing together in a clockwise direction until they meet an obstruction such as a limiting stop indicated at 108. Because of the shorter lever arm effective at sprocket 95 than at sprocket 96 a greater proportion of the force exerted on pivot point 94 is transferred to chain 101 than to chain 104. Consequently when the two arms are free of a carton the arm 52 overpowers the opposing arm 53 and the two arms swing together in a clockwise direction until they meet the stop 108.

The operation of the arms 50 and 51 is the same as that of the arms 52 and 53 except in the present embodminet the operating unit or bell crank 110 is urged by the power operating means in a clockwise direction about its pivot 111.

In some cases one pair of wipe down rolls may be adequate but in the preferred form shown two pairs are employed which, however, function in the same manner. Also independent power means may be employed for each unit but the present system conveniently and economically employs a common source of power which is effective with equal force on the two units. The power means is of an impositive type adapted to apply an elastic pressure on the operating units 90 and 110 and through the operating connections to the respective wipe down arms. The power means in the illustrated embodiment of the invention comprises a fluid pressure piston and cylinder arrangement suspended in a floating position between the two units, the cylinder 112 having a finger 113 rigid therewith pivoted at 114 between the flanges 93 of bell crank 90. Similarly piston rod 115 is threaded into a connector element 116 pivoted at 117 between the two flanges of unit 110 corresponding to flanges 93 of unit 90.

The cylinder 112 is connected to a source of pressure fluid by suitable means such as the flexible conduit 120. The supply line will include suitable control means such as a shut-off valve 121 and an adjustable pressure regulator R adapted to be manually set for the desired pressure. Other elastic power means such as a spring could be employed in place of the fluid pressure means but the present means is simple and readily adjusted for a desired selected pressure at the wipe down rolls 54 and 154, and the pressure remains constant regardless of the position of the arms as distinguished from a spring the force of which varies with the amount of distortion.

Dependent upon the circumstances including the character of the cartons or like articles to which the tape is to be applied the complete machine may include wipe down rolls located below the path of the bottom surface and adapted to apply a bottom tape. Such lower wipe down rolls and associated mechanism may be identical with the upper operating means except reversed as to position.

Figure 3A:
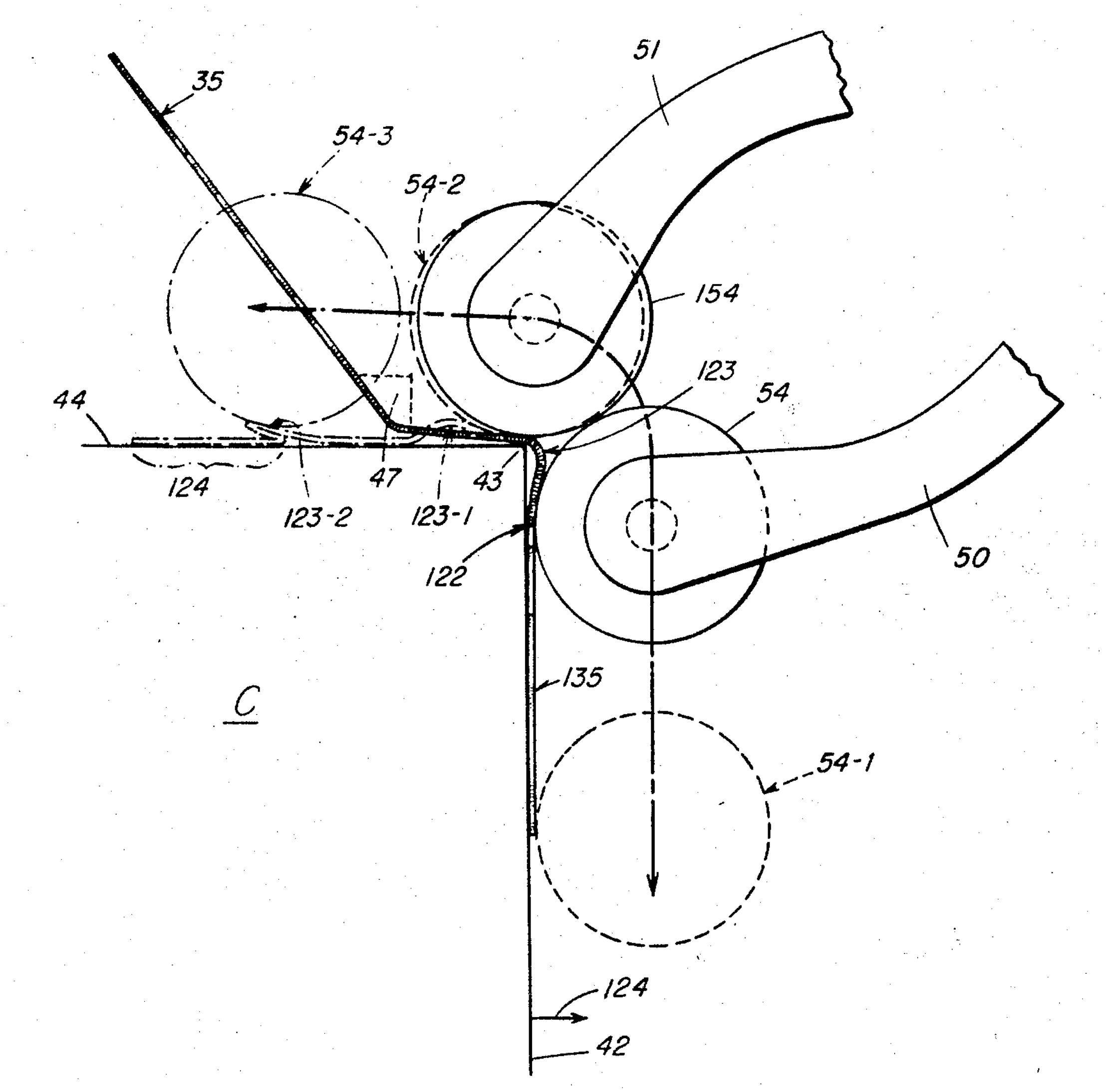
FIG. 3A is a diagrammatic view of a portion of a closed carton being translated forward in the machine of FIG. 1 and showing application to the forward top end thereof of the leading portion of a strip of gummed tape by means of a pair of the wipe down roll means shown in the left side of FIG. 2, and depicting the action thereof which may cause a transverse wrinkle in the applied tape.

As is indicated in FIG. 1 the receptive unit to which the gummed tape may be applied by mechanism shown in FIGS. 1 to 3 inclusive may be in the form of a rectangular carton C having receptive surfaces in the form of a substantially vertical leading or front end 42, a substantially flat lateral top 44 (intervened by a transverse top front corner 43), and a vertical trailing or rear end 46 (intervened by a transverse top rear corner 45). FIG 3A illustrates a progressive procedure of applying a strip 35 of the gummed tape to the top of carton C while the adhesive thereof is still moist by means of the cooperative pair of pivoted arms 50 and 51 respectively carrying the wipe down rolls 54 and 154, in a manner which may cause the formation of an undesirable transverse wrinkle in the tape. As the leading end of the tape 35 is supplied from suitable mechanism, such as supply roll 34, and a strip is severed therefrom by suitable guillotine means, its leading end 135 will be guided beneath a guide finger shown in dotted lines at 47 in FIG. 3A to depend across the path of the leading end 42 of the advancing carton C. As the advancing carton C moves forward to the vicinity of the wipe down rolls 54 and 154 this leading end 135 of the tape strip 35, with its moistened adhesive-covered rear face opposed to surfaces of the advancing carton, will be draped across the transverse front top corner 43 of the carton and will be pressed to contact of the leading carton end 42 at the point 122 by the lower or trailing roll 54 and against this transverse front top corner by the leading wipe down roll 154. At times, and all too frequently, the portion of the moistened-face tape between the points of contact at 122 and the carton corner 43 will bow out in a loose loop 123 in the mouth of the bight between the wipe down rolls 54 and 154, as is illustrated in FIG. 3A.

As the closed carton C advances further in the direction of the arrow 124 (as viewed in FIG. 3A) the resiliently biased arms 50 and 51, which respectively carry the wipe down rolls 54 and 154, will be progressively spread apart to permit the trailing wipe down roll 54 to advance vertically down along the leading end 135 of the tape strip and the vertical leading carton end wall 42 toward the dotted line position 54–1 with wipe on of this leading end of the gummed tape while its adhesive is still moist and slippery. At the same time the leading wipe down roll 154 advances back along the top surface 44 to lay the intermediate portion of the tape strip 35 snugly thereover. There may be no appreciable tendency to reduce or remove the loose tape loop 123 even though the moistened adhesive of the rear face of the tape strip can slip readily along the carton surfaces since the rolls 54 and 154 may apply no tensive forces to the tape in rolling thereover. Thus, while the leading front end 135 of the tape is being wiped on in the full line position against the vertical leading end wall 42 of the carton C by the trailing roll 54 an intermediate portion of the tape strip 35 is being wiped onto the carton top surface 44 at least in the area 124 by the leading wipe down roll 154 there to form a substantially wrinkle free stretch of the tape as is indicated by dot-dash lines in that area.

As the carton C further advances in the direction of the arrow 124, or to the right in FIG. 3A, the trailing wipe down roll 54 will then rise from the dotted position 54–1 up along the wiped on leading end 135 of the tape strip 35 and the vertical leading end wall 42 finally to roll back over the transverse top front corner 43 to a position 54–2 to carry in front of it the loose loop 123 as is indicated in broken lines at 123–1.With still further advance of the wipe down roll 154 back along the carton top surface 44 beyond the area 124 the trailing wipe down roll 54 will follow back along this top surface from the position 54–2 to, for example, a position arbitrarily indicated by dot-dash lines at 54–3. In doing so adhesion of the moistened adhesive of the tape to an extended area of the carton top surface 44 and stiffness of the tape in the flat plane above this top surface may cause it to adhere in the area 124 sufficiently as to resist any further advance of the free loop 123. Consequently, the free loop 123 in the tape strip 35 may then be flattened and pressed down into a transverse wrinkle, such as that depicted at 123–2, by the trailing roll 54 in its position 54–3. It is the purpose of the present invention to eliminate the possibility of forming such transverse wrinkles as that indicated at 123–2 in FIG. 3A, and this is accomplished by means illustrated in FIGS. 4 to 12 inclusive. As is illustrated in FIGS. 4 and 5 the means for eliminating such transverse wrinkles in the tape strip 35 as it is being applied in moistened condition may comprise a metal finger 125, which is preferably in the form of a projection or elongated rigid member, mounted on the second or trailing arm 50 by any suitable means, such as fixedly by screws 126 threadably anchored in transverse web 160 of the arm 50.

As is shown in FIG. 5 the leading or first arm 51 may be of a structure somewhat similar to the arm 53 shown in FIG. 3, equipped with enlarged hub bosses 180 and 181 rotatably mounted by suitable bearing units on tranverse shaft 65 and with the hub boss 180 equipped with the spur gear 82. The trailing or second arm 50 may also be equipped with enlarged hub bosses 170 and 172 rotatably mounted about the cross shaft 65 by suitable hearing units and with the boss 170 carrying the spur gear 74. The wipe down roll means carried by the trailing or second arm 50 is constructed in a manner to permit association therewith of the finger 125 and, for this purpose, may either be a single roll having a medial annular channel formed in its tread to receive the front end of this finger or a pair of transversely-spaced rollers 254 rotatably carried by transverse shaft 155 to provide an intervening space through which the front end of the finger extends. The FIG. 5 showing is a plan view, with parts broken away and in section, of the tape applying device including the cooperative pair of first and second pivoted arms as viewed in their relative positions of advance shown in FIG. 9, and thus as there viewed the tip end of the finger 125 is shown terminating in a rounded nose 127 which extends forward to the vertical plane in which the generatrix of the cylindrical surface of each roll 254 is located. It will be seen from FIG. 4, however, that this rounded nose 127 initially extends forward (i.e., in a direction back toward the advancing front end 42 of carbon C) from the second or trailing arm 50 an appreciable distance beyond the trailing roll means comprising the pair of transversely-spaced wipe down rolls 254.

The advantageous action of the cooperative or associated pair of first and second pivoted arm 50 and 51, respectively carrying the pair of wipe down rolls 254 and associated finger 125 and the wipe down roll 154, are illustrated in FIGS. 6 to 12 inclusive.

As is shown in FIG. 6, the leading end 135 of the strip of gummed tape 35 having its rear adhesive surface moistened is fed past and down behind the guide 47 to be draped in front of the upper portion of the advancing vertical front end 42 of the transported carton C. As is therein shown the rounded nose 127 of the finger 125 initially engages the opposite surface of the tape strip leading end 135 which does not bear the moistened adhesive and at this time prevents the rolls 254 from contacting this leading end of the tape.

As the carton C is transported further forward to the position illustrated in FIG. 7 the rounded nose 127 of the finger 125 presses the leading end 135 of the tape strip 35 back against the vertical face of the leading front end 42 of the carton while still preventing the rolls 254 from pressing adjacent portions of the tape against this vertical carton face, and as the wipe down roll 154 causes the moistened gummed surface of the tape to contact the transevrse top carton corner 43. At this time a free loop 123 of the tape may be developed between these points. With further advance of the carton C, such as to the position illustrated in FIG. 8, the rounded nose 127 of the finger 125 is caused to drag frictionally down along the tape strip leading end 135 so as to tension this portion of the tape from the point of contact thereof by the leading roll 154 at the transverse carton top edge 43. Since the moistened adhesive of the gummed surface of the tape is slippery it will slide downwardly along the carton front end face 42 by virtue of the application of this frictional drag to eliminate the free loop 123.

As is illustrated in FIG. 9, during further advance of the carton C the pivoted arm 50 swings counterclockwise further downward with continued or progressive frictional drag of the rounded nose 127 of the finger 125 against the ungummed surface of the leading end 135 of the tape strip until the pair of wipe on rolls 254 carried by this arm are also swung back to contact of this surface of the tape. Simultaneously, this advance of the carton C causes its transverse leading top edge 43 and its top surface 44 to advance forward beneath the wipe down roll 154 carried by the cooperative pivoted arm 51, so as to apply the moistened gummed surface of the tape strip 35 to the carton top surface. Continued advance of the carton C will bring about the condition illustrated in FIG. 10 in which further counterclockwise swing of the arm 50 causes the rounded nose 127 of the finger 125 to be swung away from or forward of the vertical front end surface 42 of the carton while the rolls 254 roll down the tape strip leading end 135 to the position 128 of the axis of these rolls, attended by still further advance of the leading wipe down roll 154 back along the carton top surface 44 and the mid-portion of the tape strip 35 to stretch the latter from the transverse carton top front corner 43 to snug adjacency over the carton top. From this point onward in the progressive laying down of the tape strip 35 the rounded nose 127 of the finger 125 remains out of contact with the outside surface of the tape strip.

As is shown in FIG. 11 still further advance of the carton C causes the trailing rolls 254 now to rise along the tensioned and laid leading end 135 of the tape strip 35 and the leading vertical end wall 42 of the carton to roll up over the transverse leading top corner 43 of the carton while the leading wipe down roll 154 is approaching the transevrse rear top corner 45 of the carton. FIG. 12 illustrates that continued advance of the carton C now causes the leading wipe down roll 154 to turn down over the transverse rear top corner 45 of the carton C and smooth down the trailing end 235 of the tape strip 35 snugly against the vertical carton back end 46 to complete the smooth application of the tape strip to the receptive front end, top and back end of the carton, while the nose 127 of the finger 125 is maintained out of contact with the tape strip during travel of the wipe down rolls 254 from the position of FIG. 9 through the positions of FIGS. 10 and 11, and that the tape strip is laid down by this equipment free of transverse wrinkles, such as that illustrated at 123–2 in FIG. 3A. The second set or cooperative pair of pivoted arms 52 and 53 now apply rolling pressure by their wipe down rolls 54 and 154 to the applied strip of tape 35 so as to assure snug contact between the gummed surface of the latter and the receptive surfaces of the carton as the moistened adhesive further sets up to fix the tape under tensioned condition over the carton top.

It will be understood from FIG. 6 that the rounded nose 127 of the finger 125 is located generally in a plane in which are disposed the axis **65*a* and 155*a* respectively of the pivoting of the arm 50 and the rolls 254. However, it is to be understood that the effectiveness of the finger 125 and its drag nose 127 are not dependent upon a precise location of this nature, and that the latter may be located a resonable distance to either one side or the other of such a plane. Further, the practice of the present invention is not limited to the use of such finger means in the form of a rigid member or to fixed mount thereof to the pivoted arm 50. For example, the drag nose 127** may be supported by means having some flexibility or attached to the pivoted arm by means having limited resiliency or that which may permit limited relative articulation. Also, such drag nose may be in the form of or provided with a cap of rubber or other material having a relatively high coefficient of static friction to provide a greater drag characteristic than that which may be provided by a metallic nib or finger tip of metal. The drag of frictional engagement of the ungummed surface of such adhesive tape can readily be determined by one skilled in this art in relation to the smoothness of the ungummed surface, the thickness and strength of the tape and the amount of frictional force required to apply sufficient tension to the tape to cause its wet or moistened gummed surface to slide along the package or carton face or other surface against which the tape is being applied as to eliminate therefrom any loose loops. While in the embodiment of the invention illustrated in the attached drawings it is proposed that the drag tip of the finger or projection be located in the general vicinity of a plane in which are disposed the axes of the swinging or pivoted trailing arm and of the roll means rotatably carried thereby and at a point beyond the periphery of this roll means and to the side of the latter opposite that to which the point of pivoting of the arm is located, it is to be understood that it may be offset angularly from this plane to either side thereof an appreciable distance so long as the location of the drag tip will perform the desired functions. This drag tip initially must engage against the ungummed face of the strip of tape as the arm carries the trailing roll means theretoward, whether or not the roll means is simultaneously brought to engagement of this same tape surface or is held away from engagement therewith by this engaging drag tip. The location of the drag tip must be such that thereafter it will drag along the ungummed surface of the tape strip as the latter is being laid down thereby against the receptive surface of the package, carton or other unit to which the tape is being applied even though the roll means carried by this arm likewise engages this tape strip face and rolls along thereover either ahead of or behind the drag tip. In the event that the roll means carried by this trailing arm is held spaced from the ungummed face of the tape strip in the laying down of the leading end of the latter it must not be located so far radially beyond the axis of this roll means as to prevent the periphery of the latter from being brought ultimately into contact with this same tape face when the direction of the roll means is reversed to travel back over the portion of the tape strip which is laid down and tensioned by the frictional drag of the drag tip thereover, so as to assure obtainment of the advantage of the rolling action of the roll means against the tape.

It will thus be seen that an embodiment of the present invention may include a swinging arm with which is associated means mounting this arm for swinging action about a predetermined location, whether this location is a fixed pivot point or a floating point of pivoting action, and with this arm having a free portion located remote from this swinging action location. Such embodiment of the invention includes tape wipe down roll means which is rotatably carried by this arm free portion for swing therewith. This swinging arm also carries a pojection having a portion extending beyond the rotatable roll means supported on the same arm, and this extending portion of the projection is provided with a drag tip which is located radially outward of the periphery of this roll means for frictionally engaging and dragging against a strip of such tape in swing of the arm for applying such tension to the tape strip as it is being laid down which will remove any loose loops therefrom.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In a gummed tape applying device the combination with (a) a swinging arm, (b) means mounting said arm for swinging action about a predetermined location with said arm having a free portion located remote from said location and extending in a certain direction, (c) tape wipe down roll means rotatably carried by said arm free portion for swing therewith, and (d) leading tape engaging wipe down means associated with said arm for engaging a portion of a strip of tape draped across a corner of a receptive unit defined betwen a pair of angularly related surfaces of said unit and pressing said tape against a second one of said surfaces which is back of said corner while said roll means is moved forward along the leading end portion of said tape draped along the first of said surfaces beyond said corner for ultimate reverse rolling contact against said leading tape end portion back to and over said corner as said leading wipe down means retracts from said corner to wipe the tape against said second surface, wherein the improvement comprises (e) a projection carried by said arm having a portion extending away from the free portion of the latter beyond said roll means in the general direction of extension of said arm free portion, and (f) a drag tip on said extending projection portion located radially outward of the periphery of said roll means for frictionally engaging and dragging forward against the leading end of such tape for progressively pressing and wiping down the latter against said first surface in swing of said arm in one direction and for applying tension to such leading end of said tape strip and its portion draped across said corner forward of engagement thereof by said leading wipe down means during such forward frictional drag against the tape leading end portion, said drag tip being swingable out away from engagement with said tape leading end portion by said arm when the latter is swung in the opposite direction to engage said roll means against said wiped down leading end portion of said tape for the ultimate reverse rolling contact against the latter by said roll means back to and beyond said corner.

2. The gummed tape applying means of claim 1 in which said projection and its drag tip are defined by means locating said tip at the side of said roll means opposite that of the latter to which the swing location of said arm is located.

3. In a gummed tape applying device including a cooperative pair of first and second swinging arms each carrying at its free end tape wipe down rotary roll means and means biasing their roll means carrying free ends toward each other which permits them to spread apart angularly as the pair of roll means roll over angularly related receptive unit surfaces including a first and a second of such surfaces intervened by a corner with the roll means carried by said second arm trailing the leading one carried by said first arm and being adapted to wipe on a leading end portion of a strip of the tape against said first surface with ultimate wiping on of the tape back over said corner and along said second surface by cooperative action of said roll means, the improvement comprising (a) a finger mounted on said second arm which carries said trailing roll means, (b) said finger having a nose extending forward from said second arm beyond said trailing roll means adapted initially to contact said tape strip leading end portion and press it progressively against said first receptive unit surface forward of said corner while said leading roll means presses said tape against said second receptive unit surface, said nose applying frictional drag to said tape strip leading end portion to tension it over said corner from the point of contact of the tape by said leading roll means as said nose advances along said tape leading end portion progressively to wipe it down on said first surface so as to eliminate any wrinkle-forming loose loop in the intervening tape portion, the nose of said finger being swingable away from contact with said wiped on leading end portion of said tape by swing of said trailing arm to engage its trailing roll means against the wiped on leading end portion for retractive wiping of the wiped on tape back to and over said corner.

4. The gummed tape applying device as defined in claim 3 in which said finger is a rigid member fixedly carried by said second arm.

5. The gummed tape applying device as defined in claim 3 in which means are provided to pivot said second arm about an axis for its swinging action and said finger nose extends forward beyond said trailing roll means in the general vicinity of a plane through the axes of said arm and its roll means on the side of the latter opposite said arm axis.

References Cited

UNITED STATES PATENTS

| | | | |
|---|---|---|---|
| 1,856,576 | 5/1932 | Maxwell | 156—489 X |
| 2,052,903 | 9/1936 | Stafmeier | 156—468 |
| 2,787,396 | 4/1957 | Christensson | 156—486 X |
| 3,009,201 | 11/1961 | Hansen | 156—486 X |
| 3,028,275 | 4/1962 | Peterson et al. | 156—486 |
| 3,108,922 | 10/1963 | Possis et al. | 156—468 |

EARL M. BERGERT, Primary Examiner

H. F. EPSTEIN, Assistant Examiner

U.S. Cl X.R.

156—489